(12) United States Patent
Braford, Jr.

(10) Patent No.: US 7,559,415 B2
(45) Date of Patent: Jul. 14, 2009

(54) HYDRAULIC SYNCHRONIZER

(75) Inventor: Thomas E. Braford, Jr., Brighton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 442 days.

(21) Appl. No.: 11/582,582

(22) Filed: Oct. 18, 2006

(65) Prior Publication Data

US 2007/0181397 A1  Aug. 9, 2007

Related U.S. Application Data

(60) Provisional application No. 60/765,402, filed on Feb. 3, 2006.

(51) Int. Cl.
  *F16D 23/02* (2006.01)
(52) U.S. Cl. ............... 192/53.32; 192/53.33; 192/53.34
(58) Field of Classification Search ................ 192/53.3, 192/53.32, 53.33, 53.34, 53.35
  See application file for complete search history.

(56) References Cited

U.S. PATENT DOCUMENTS

| | | | |
|---|---|---|---|
| 3,739,890 A * | 6/1973 | Nolli | 192/53.331 |
| 3,921,469 A * | 11/1975 | Richards | 74/339 |
| 4,131,185 A | 12/1978 | Schall | |
| 5,377,800 A * | 1/1995 | Sperduti et al. | 192/85 CA |
| 5,560,461 A | 10/1996 | Loeffler | |
| 5,845,754 A | 12/1998 | Weilant | |
| 6,012,561 A | 1/2000 | Reed, Jr. et al. | |
| 6,588,562 B2 | 7/2003 | Fernandez | |
| 6,647,816 B1 | 11/2003 | Vukovich et al. | |
| 6,826,974 B2 | 12/2004 | Kobayashi | |
| 2004/0055844 A1* | 3/2004 | Ebenhoch et al. | 192/53.1 |
| 2006/0049018 A1* | 3/2006 | Legner | 192/53.34 |

\* cited by examiner

*Primary Examiner*—Ha D. Ho
(74) *Attorney, Agent, or Firm*—Warn Partners, P.C.

(57) ABSTRACT

A synchronizer for first and second drives is provided which includes a first drive having a first fluid passage, a hub affixed with the first drive having a second fluid passage connected with the first fluid passage, a piston mounted on the hub forming a control volume between the piston and the hub, the control volume intersecting the second passage, the piston being responsive to fluid pressure within the control volume, a friction member rotated with the hub being moved by the piston and a friction surface rotating with the second drive member for engagement with the friction member to synchronize the first and second drives together, first teeth rotating with the hub being moved by the piston, and second teeth rotating with said second drive member.

20 Claims, 5 Drawing Sheets

HYDRAULIC SYNCHRONIZER

CROSS-REFERENCE TO RELATED APPLICATIONS

This application claims the benefit of U.S. Provisional Application No. 60/765,402 filed Feb. 3, 2006.

TECHNICAL FIELD

The present invention relates to synchronizers, especially synchronizers used in dual clutch automatic transmissions (DCT) such as shown in U.S. Pat. No. 6,012,561, Reed Jr. et al., the disclosure of which is incorporated by reference herein.

BACKGROUND OF THE INVENTION

The conventional gear selection system used for most if not all of DCTs in production today is synchronizers. The synchronizers are engaged and disengaged through a hydraulic actuation valve via a standard manual shift fork and rail system. One of the disadvantages to this system is the differential speed between the shift fork and the sleeve of the synchronizer. The above noted interface requires sufficient lubrication to prevent wear. Another issue with DCT is that high clutch drag can sometime cause block out of the engagement of the synchronizer or prevent a blocker ring from indexing.

SUMMARY OF THE INVENTION

The present invention provides a hydraulic actuated synchronizer that eliminates the shift fork in a manner that is an alternative to those revealed prior.

Other features of the invention will become more apparent to those skilled in the art as the invention is further revealed in the accompanying drawings and Detailed Description of the Invention.

DETAILED DESCRIPTION OF THE INVENTION

Figure 1:
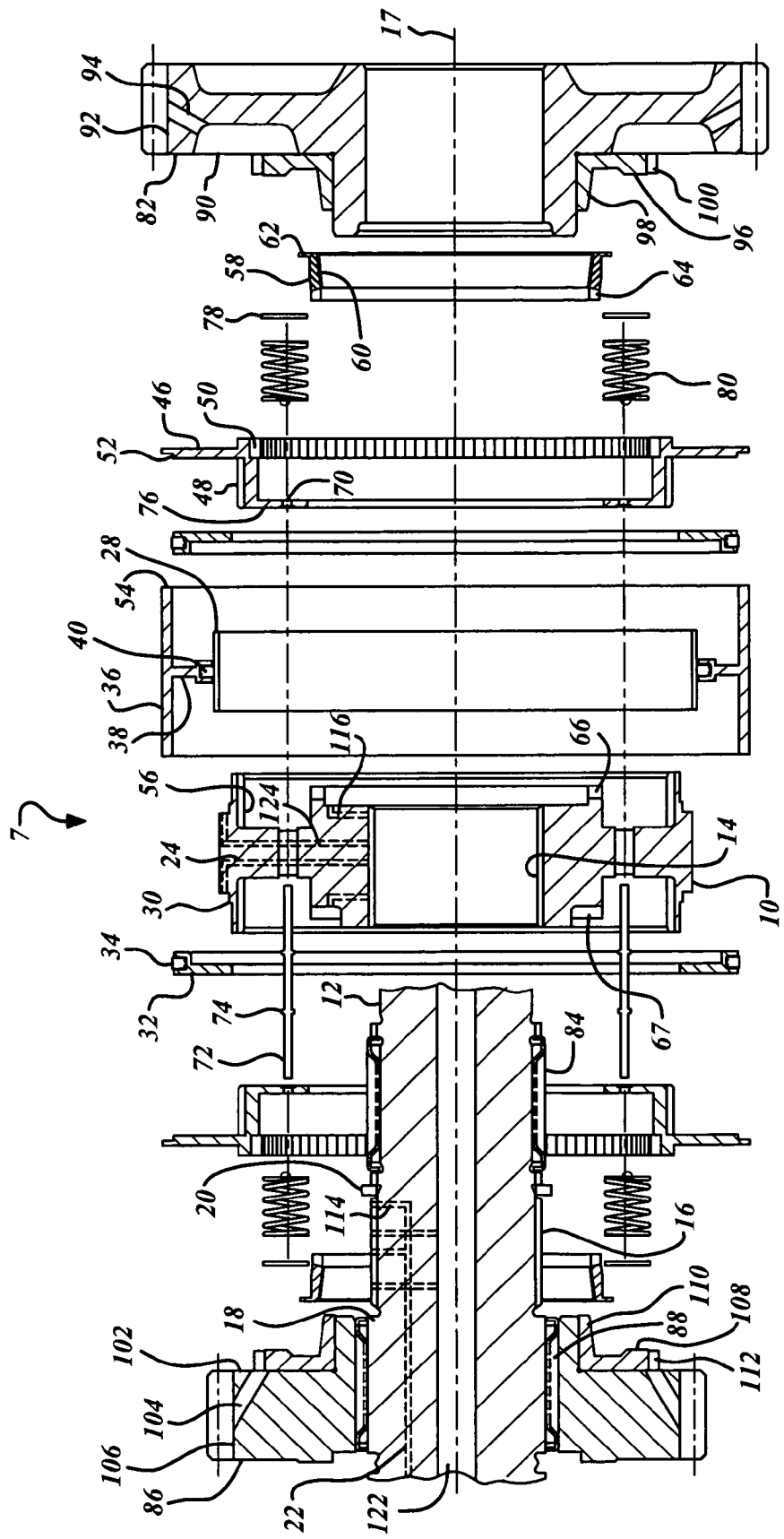
FIG. 1 is an exploded view of a synchronizer of the present invention.
Figure 2:
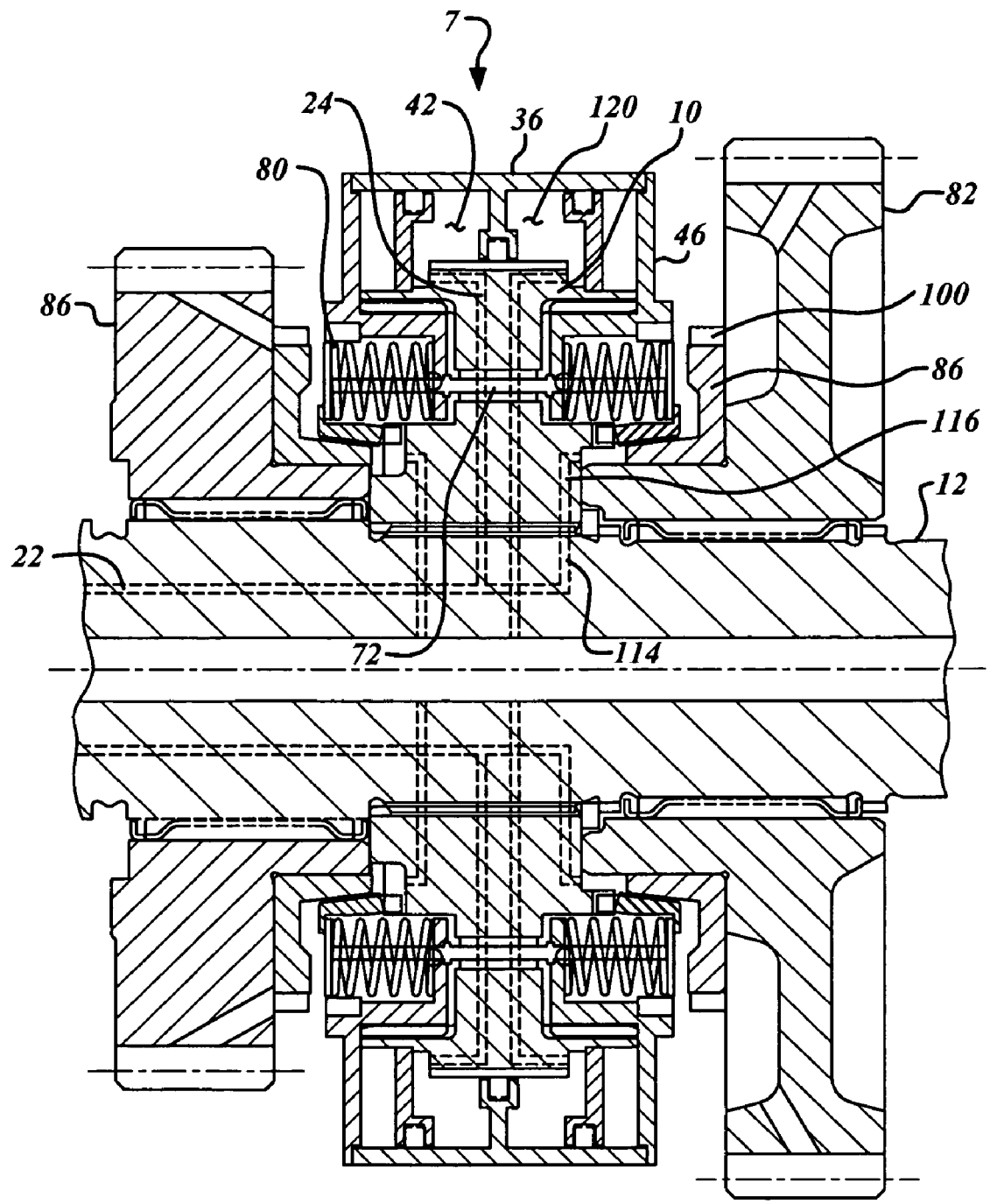
FIG. 2 is a partial sectional view of the synchronizer shown in FIG. 1.
Figure 3:
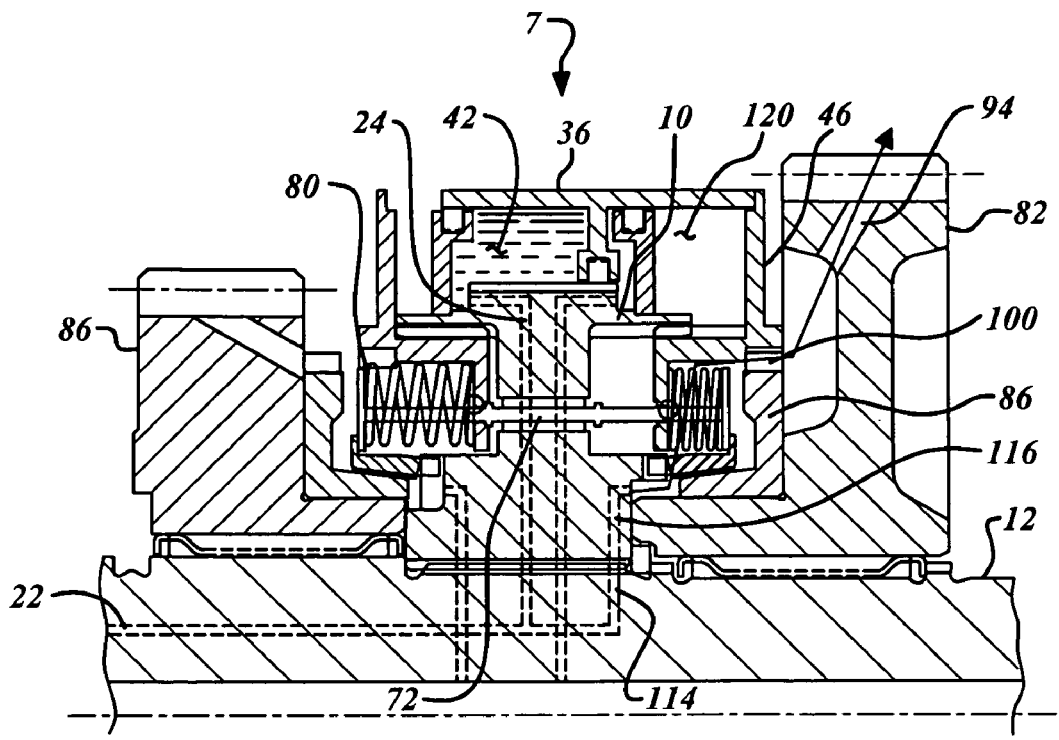
FIG. 3 is an operational view of the synchronizer shown in FIGS. 1 and 2.

Referring to FIGS. 1-3, a synchronizer 7 of the present invention is provided. The synchronizer 7 has a hub 10. The hub 10 is affixed on a first drive provided by a rotating shaft 12 by a series of spline teeth 14. The spline teeth 14 engage spline teeth 16 of the shaft 12. Accordingly, the shaft 12 and hub 10 rotate about a common axis 17. The shaft 12 has a shoulder 18 that can be used to axially captures the hub 10 against a stop 20 to secure against axial movement of the hub 10 relative to the shaft 12. Extending at least partially through the shaft 12 is a first fluid passage 22. The hub 12 has a second fluid passage 24 that is fluidly connected to the first fluid passage 22.

Press fitted on the hub 10 is a cylinder 28. Press fitted on the hub 10 against hub shoulders 30 are two end plates 32. A radial extreme end of the end plates 32 mount a ring sealing member 34. Slideably sealably mounted on an outer diameter of the hub 10 is a dual piston 36. The piston 36 has a divider plate 38 that mounts on its extreme end a ring sealing member 40 forming connected pistons with a common body. The piston 36 forms variable control volumes 42 and 120 with the hub 10. The control volume 42 intersects the second passage 24. The piston 36 has axial movement along an axis 17 in response to the fluid pressure within the control volume 42.

The synchronizer 7 has two brackets 46. The bracket 46 has spline teeth 48 that engage hub spline teeth 56 causing the bracket 46 to rotate with the hub 10. The bracket 46 has a shoulder 52 that abuts an axial end 54 of the piston 36 to allow the bracket 46 to be moved along the axis 17 by the piston 36. The bracket 46 has gear teeth 50.

The synchronizer 7 has a friction member provided by a synchronizer cone 58. The cone 58 has a friction surface 60 that is angled with respect to the axis 17. As shown in FIGS. 1-3, a paper fiber base friction material provides the surface 60. The cone 58 has a flange 62. The cone 58 has a tab 64 that extends into a notch 66 or 67 of the hub 10 allowing the cone 58 to rotate with the hub 10.

The bracket 48 has a series of pin holes 70. Extending through each pinhole 70 is a spring pin 72. The pin 72 has shoulders 74 that abut against an inboard surface 76 of the brackets 46 to limit the position of the brackets 46 relative to the pin 72. The pin 72 at its opposite end has a connected nail head 78. The nail head 78 captures between itself and the bracket 46 a coil return coiled spring 80 to bias the bracket 46 and the piston 36 to a neutral non-engaged position.

A second drive is provided by a gear 82 rotatably connected on the shaft 12 by a needle bearing 84. In a similar manner, a third drive is provided by a gear 86 mounted on a needle bearing 88. The gears 82, 86, and the hub 10 are axially fixed on the shaft 12. The gear 82 has a side face 90 and a gear tooth face 92. A second drive lubrication passage 94 connects the side face 90 with the gear face 92. Interference or press fitted on the gear 82 is a dog leg 96. The dog leg 96 has a friction surface 98 and gear teeth 100.

In a manner similar to that described for a the gear 82, gear 86 has a side face 102, a third drive lubricating passage 104, gear face 106 and a dog leg 108 a with friction surface 110 and gear teeth 112.

In operation, the gears 82 and 86 mesh with other gears on a different shaft (not shown) of a transmission. Typically, the gears 82 and 86 provide the transmission with two gear ratios that are two gear shift ratios apart. For example, gear 86 can be the second gear and gear 82 can be the fourth gear. If the transmission is in fifth gear, the synchronizer 7 is in the neutral position as shown at the top of FIG. 3. In the neutral position, both gears 82 and 86 are free to turn on the shaft 12. Another gear (not shown) is torsionally connected with the shaft 12 to cause the transmission to be in the fifth gear. If the transmission controller desires to down shift to the fourth gear, a hydraulic valve (not shown) is signaled to pressurize the first fluid passage 22. Fluid (transmission fluid) then flows into the control volume 42 via the second passage 24. Pressure within the control volume 42 causes the piston 36 to be pushed rightward thereby moving the bracket 46 to the right. The rightward movement of the bracket 46 compress the springs 80 against the nail heads 78. The rightward movement of the nail head 78 pushes the cone flange 62 rightward causing the friction surface 60 to engage with the dog leg friction surface 98. As the friction surfaces 60 and 98 slip with respect to one another, the gear 82 is brought up to a rotational speed of the shaft 12. As a piston 36 is further moved to the right the synchronization between the shaft 12 and the gear 82 rotational speeds is achieved. Further rightward movement of the piston 36 causes the bracket gear teeth 52 to engage with the gear teeth 100 of the dog leg 96. At this point, the gear 82 is fully torsionally connected with the shaft 12 and the transmission is in the fourth gear.

The shaft 12 also has a shaft lubrication supply passage 114 that intersects with the first fluid passage 22. The shaft lubrication supply passage 114 is fluidly connected with a hub lubrication passage 116. Pressurize oil (transmission fluid) flowing through the hub lubrication passage 116 lubricates the interface between the friction surfaces 60 and 98 as well as the interface between the gear teeth 50 and 100. The oil from the hub lubrication passage 116 will eventually pass through the second drive lubrication passage 94 before lubricating the gear tooth face 92.

If the transmission down shifts to third gear, fluid pressure within the first fluid passage 22 will be released causing a depressurization of the first control volume 42. Return springs 80 will pushed the bracket 46 leftward causing the teeth 50 and 100 to disengage. Further leftward movement of the bracket 46 causes the friction surfaces 60 and 98 to disengage.

When the control volume 42 is pressurized and the bracket 46 is moved rightward, return springs 80 on both sides of the hub 10 both are compressed. The return springs 80 on the right hand side of the hub will be compressed a greatest amount. The return springs 80 on both sides of the hub 10 will contribute to the return of the pin 72 to the neutral position increasing the reaction time of the synchronizer 7 to the released or neutral position. The spring constant of the return springs 80 can vary due to manufacturing tolerances. If the springs 80 are not equally matched in their spring constant across the hub 10, the springs 80 can cause the synchronizer 7 to have a tendency to self-engage. To prevent the above noted tendency pin shoulders 74 are provided which limit the axial position of the brackets 46 on the pins 72.

Figure 4:
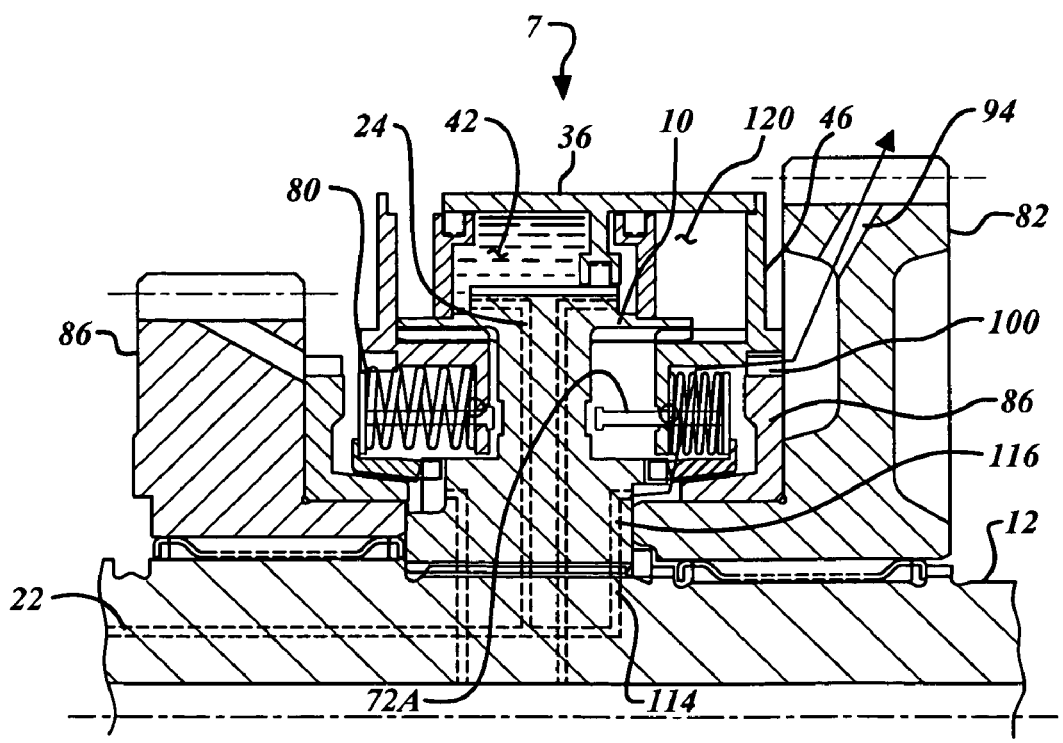
FIG. 4 is a view similar to FIG. 2 of the alternate preferred embodiment synchronizer to that shown in shown in FIGS. 1 and 2.

In an alternate preferred embodiment synchronizer 127 shown in FIG. 4, the pin 72 function is performed by two pins 72A. In this design, returned springs 80 on one side of the hub 10 are used to return the piston 36 to the neutral position. Reaction time to the neutral position can be improved by momentarily pressurizing the control volume 120. The embodiment of FIG. 4 saves the machining costs of a through bore in the hub 10 for a pin 72.

To place the transmission into the second gear, the control volume 120 is pressurized via a separate fluid passage 122 (hereinafter referred to as the third fluid passage) and a fourth fluid passage 124. The operation for engagement of the second gear 86 to the shaft 12 is substantially identical to that described for engagement of the gear 82.

Figure 5:
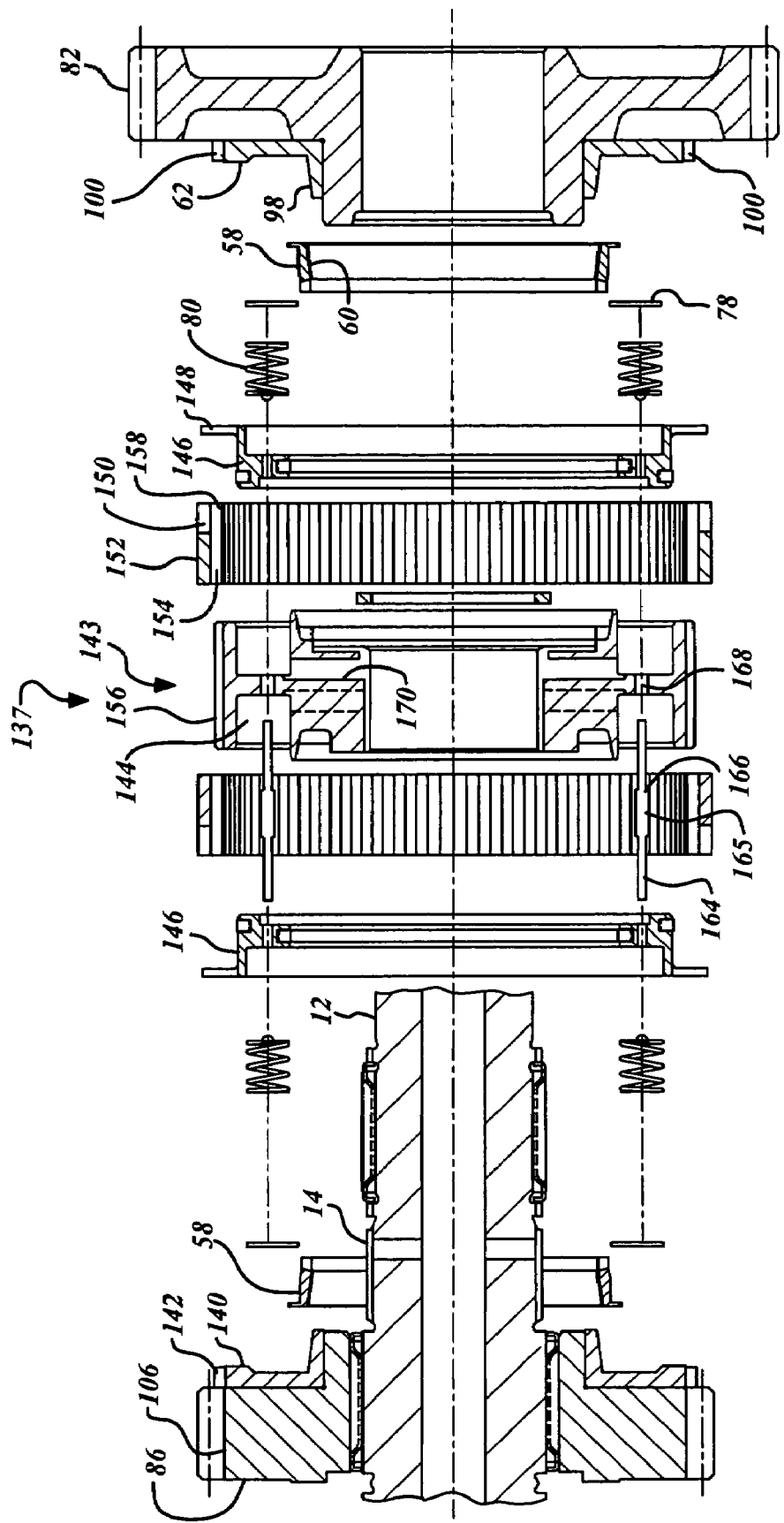
FIG. 5 is an exploded view of another alternative embodiment synchronizer of the present invention.
Figure 6:
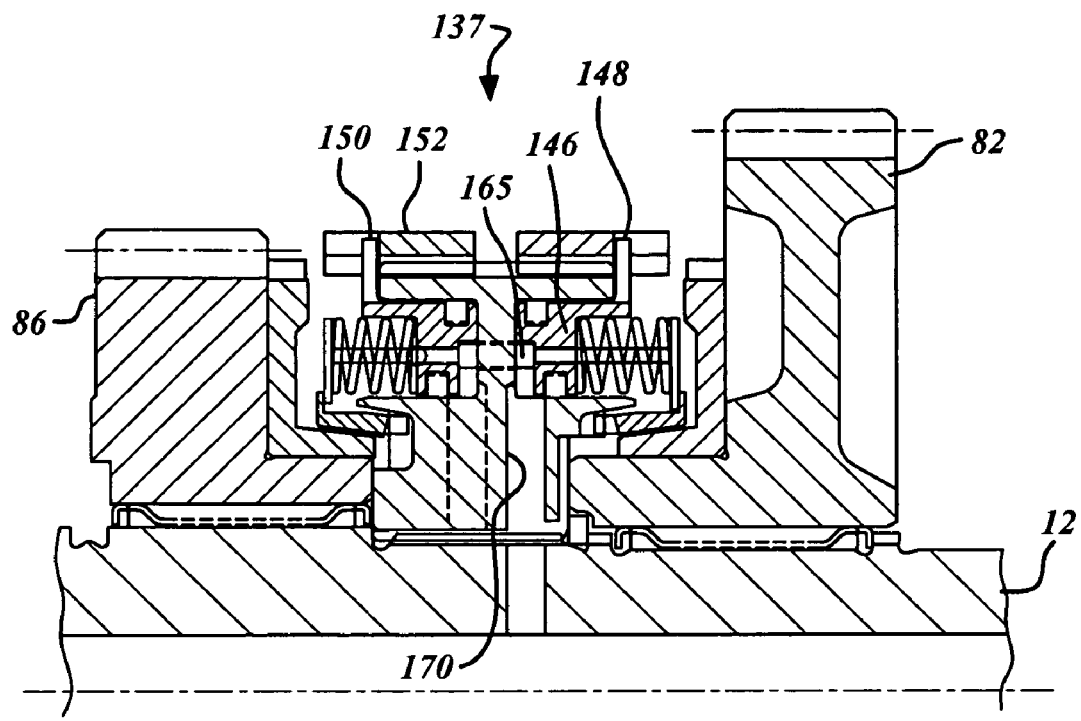
FIG. 6 is a partial sectional view of the synchronizer shown in FIG. 5.
Figure 7:
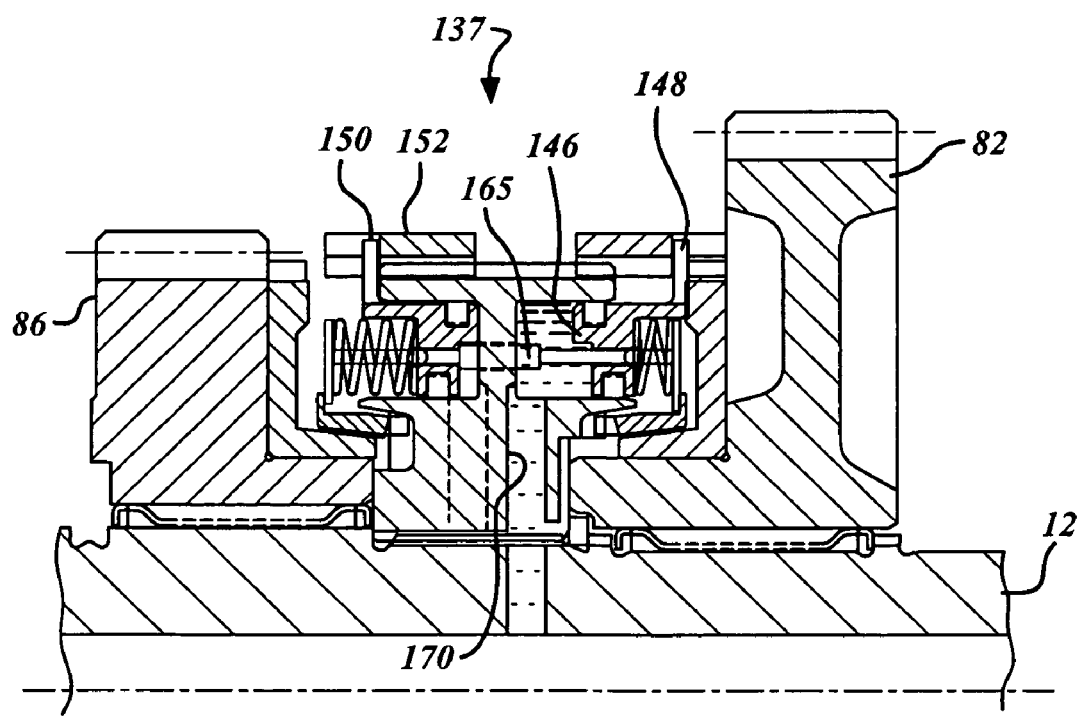
FIG. 7 is an operational view of the synchronizer shown in FIGS. 5 and 6.

Referring to FIGS. 5-7, an alternate preferred embodiment synchronizer 137 is provided with like items performing similar functions to that shown for synchronizer being given identical reference numerals. Dog leg 140 of the gear 86 has its gear teeth 142 at a common diameter with the gear teeth face 106. The synchronizer 137 has a hub 143 with an annular groove 144. Slideably mounted in the groove 144 is a piston 146. The pistons 146 have radial tabs 148 captured in a radial slot 150 of an apply cylinder 152. The apply cylinder 152 has an inboard inner diameter with spline teeth 154 allowing the apply cylinder 152 to rotate with the spline teeth 156 of the hub outer diameter. The cylinder 152 along an outboard inner diameter has gear teeth 158 for engaging with gear teeth 100 or 142 one of the dog legs 140 or 162. Teeth 154 and 158 can be a common structure. The pin 164 has enlarged center portion 165. The enlarged center portion 165 at its ends has shoulders 166 to axially limit the position of the piston 146 to prevent self-activation due to uneven strength in the return springs 80 as previously described. Additionally the center portion 165 is closely fitted with a pinhole 168 of the hub to prevent bleed through to the opposite groove 144 when the piston 146 is actuated.

In operation, a second passage 170 is pressurized to pressurize the control volume provided by the groove 144. The piston 146 is pushed rightward causing the nail head 78 to go against the cone flange 62. The friction surfaces 60, 98 engage as previously described. When the speed the gear 82 has been synchronized the gear teeth 158 mesh with the gear teeth 100. To activate the gear 86, the opposite piston 146 is activated in a similar manner.

While preferred embodiments of the present invention have been disclosed, it is to be understood it has been described by way of example only, and various modifications can be made without departing from the spirit and scope of the invention as it is encompassed in the following claims.

What is claimed is:

1. A synchronizer for first and second drives disposed for relative rotation about a common axis and secured against axial movement relative to one another, said first drive having a first fluid passage extending at least partially therethrough, said synchronizer comprising:
   a hub affixed with said first drive, said hub having a second fluid passage fluidly connected with said first fluid passage;
   a piston sealably mounted on said hub forming a control volume between said piston and said hub, said control volume intersecting with said second passage, said piston having movement along said common axis in response to fluid pressure within said control volume;
   a synchronizer cone rotated with said hub having a friction surface angled with respect said common axis, said synchronizer cone being move by said piston;
   a friction surface rotating with said second drive for engagement with said synchronizer cone to synchronize said first and second drives together;
   first teeth rotating with said hub being moved by said piston along said common axis; and
   second teeth rotating with said second drive for meshed contact with said first teeth by virtue of movement of said piston.

2. A synchronizer as described in claim 1 wherein said piston is spring biased to a neutral position.

3. A synchronizer as described in claim 1 wherein said hub has a separate lubrication passage fluidly connected with said first passage to lubricate said second drive when said piston is moved by fluid pressure within said control volume.

4. A synchronizer as described in claim 3 wherein said second drive has a side face and a gear tooth face and lubricant from said lubrication passage can flow from said side face to said tooth face through a second drive lubrication passage.

5. A synchronizer as described in claim 1 wherein said piston is mounted along an outer diameter of said hub.

6. A synchronizer as described in claim 1 wherein there is a bracket between said piston and said second teeth and wherein said bracket has said first teeth.

7. A synchronizer as described in claim 6 wherein a return spring is captured between said cone and said bracket.

8. A synchronizer as described in claim 7 wherein said piston is along an outer diameter of said hub.

9. A synchronizer as described in claim 1 wherein said friction surface rotating with said second drive and said second teeth are provided by a dog leg connected with said second drive.

10. A synchronizer as described in claim 1 wherein said first and second teeth are gear teeth.

11. A synchronizer as described in claim 1 wherein said synchronizer has said first teeth generally at a diameter of a hub outer diameter.

12. A synchronizer as described in claim 1 wherein said synchronizer has said second teeth generally at a diameter of a gear face of said second drive.

13. A synchronizer as described in claim 1 further including a third drive disposed for relative rotation about said common axis and secured against axial movement relative to said first drive, and wherein said first drive has a third fluid passage extending at least partially therethrough and said hub having a fourth fluid passage fluidly connected with said third fluid passage, and said synchronizer has another set of piston, synchronizer cone, and first and second sets of gear teeth to synchronize and connect said first and third drives together in a manner aforedescribed for connecting said first and second drives together.

14. A synchronizer as described in claim 13 wherein said pistons are provided on a common body.

15. A synchronizer as described in claim 13 having return springs mounted on a common pin extending through said hub.

16. A synchronizer as described in claim 15 wherein said pin has shoulders to prevent self-actuation of said synchronizer.

17. A synchronizer for first and second drives disposed for relative rotation about a common axis and secured against axial movement relative to one another, said first drive having a first fluid passage extending at least partially therethrough, said synchronizer comprising:
  a hub affixed with said first drive, said hub having a second fluid passage fluidly connected with said first fluid passage;
  a piston sealably mounted on an outer diameter of said hub forming a control volume between said piston and said hub, said control volume intersecting with said second passage, said piston having movement along said common axis in response to fluid pressure within said control volume;
  a friction member rotated with said hub being moved by said piston;
  a friction surface rotating with said second drive for engagement with said friction member to synchronize said first and second drives together;
  first teeth rotating with said hub being moved by said piston along said common axis; and
  second teeth rotating with said second drive for meshed contact with said first teeth by virtue of movement of said piston.

18. A synchronizer for first, second and third drives disposed for relative rotation about a common axis and secured against axial movement relative to one another, said first drive having a first fluid passage and a third fluid passage extending at least partially therethrough, said synchronizer comprising:
  a hub affixed with said first drive, said hub having second and fourth fluid passages respectively fluidly connected with said first and third fluid passages;
  pistons sealably mounted on said hub forming control volumes between said pistons and said hub, said control volumes respectively intersecting with said second and fourth passages, said pistons having movement along said common axis in response to fluid pressure within said control volumes;
  friction members rotated with said hub being moved by said respective pistons;
  friction surfaces rotating with said respective second and third drives for engagement with said friction members to synchronize said second and third drives with said first drive;
  a set of respective first teeth rotating with said hub being moved by said pistons along said common axis;
  second teeth rotating with said respective second and third drives for meshed contact with said first teeth by virtue of movement of said respective piston; and
  return springs mounted on a common pin to bias said pistons to a non-actuated position.

19. A synchronizer as described in claim 18 wherein said pin has shoulders to prevent self actuation of said synchronizer.

20. A synchronizer as described in claim 18 wherein said pistons are provided on a common body.

* * * * *